United States Patent
Marcotte

(10) Patent No.: US 10,649,856 B2
(45) Date of Patent: May 12, 2020

(54) CONCURRENT WRITING TO A FILE DURING BACKUP OF THE FILE

(71) Applicant: INTERNATIONAL BUSINESS MACHINES CORPORATION, Armonk, NY (US)

(72) Inventor: Scott T. Marcotte, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 15/693,877

(22) Filed: Sep. 1, 2017

(65) Prior Publication Data

US 2019/0073272 A1    Mar. 7, 2019

(51) Int. Cl.
G06F 16/00     (2019.01)
G06F 11/14     (2006.01)
G06F 16/11     (2019.01)
G06F 16/176    (2019.01)

(52) U.S. Cl.
CPC ...... *G06F 11/1458* (2013.01); *G06F 11/1466* (2013.01); *G06F 16/128* (2019.01); *G06F 16/1774* (2019.01); *G06F 2201/84* (2013.01)

(58) Field of Classification Search
CPC ............ G06F 11/1458; G06F 11/1466; G06F 16/128; G06F 16/1774
See application file for complete search history.

(56) References Cited

U.S. PATENT DOCUMENTS

| | | |
|---|---|---|
| 8,099,391 B1 | 1/2012 | Monckton |
| 8,386,428 B2 | 2/2013 | Kuznetzov et al. |
| 8,751,515 B1 | 6/2014 | Xing et al. |
| 8,832,029 B2 | 9/2014 | Bezbaruah et al. |
| 9,047,238 B2 | 6/2015 | Zaslavsky et al. |
| 2003/0158861 A1* | 8/2003 | Sawdon ............... G06F 11/1435 |
| 2004/0107176 A1* | 6/2004 | Fuente .................. G06F 3/0607 |

(Continued)

FOREIGN PATENT DOCUMENTS

EP    2407884 A2    1/2012

OTHER PUBLICATIONS

Jing Yang, "ST-CDP: Snapshots in TRAP for Continuous Data Protection", IEEE Transactions on Compters, vol. 61, No. 6, Jun. 2012, pp. 753-766.

*Primary Examiner* — Tarek Chbouki
(74) *Attorney, Agent, or Firm* — Cantor Colburn LLP; William Kinnaman

(57) ABSTRACT

A memory-only snapshot of a file is disclosed that can be used by a system to perform a read of the file without disrupting other systems from reading or writing to the file. The in-memory snapshot structure includes a copy of allocation information of the file that points to the file data and be can be used by a backup application to read a file. A lock manager is provided that is configured to include an output parameter for file locks that includes allocation information associated with the in-memory file snapshot, thereby notifying a writer to the file that it must perform copy-on operations. A free space manager is also provided that is configured to track pinned blocks so as to both allow a write to a file to free snapshot blocks, while also preventing the freed blocks from being allocated to other files until backup read processing is completed.

11 Claims, 12 Drawing Sheets

(56) References Cited

U.S. PATENT DOCUMENTS

| | | | | |
|---|---|---|---|---|
| 2005/0132129 A1* | 6/2005 | Venkiteswaran | ..... | G06F 3/0616 |
| | | | | 711/103 |
| 2005/0251500 A1* | 11/2005 | Vahalia | ............... | G06F 16/1774 |
| 2008/0288546 A1* | 11/2008 | Adkins | ................. | G06F 16/128 |
| 2009/0043971 A1* | 2/2009 | Kim | ..................... | G06F 3/0619 |
| | | | | 711/150 |
| 2010/0174690 A1* | 7/2010 | Marcotte | ............... | G06F 16/178 |
| | | | | 707/695 |
| 2012/0150926 A1* | 6/2012 | Adkins | ................... | G06F 16/18 |
| | | | | 707/825 |
| 2017/0235646 A1* | 8/2017 | Bhagat | ............... | G06F 11/1464 |
| | | | | 711/138 |

* cited by examiner

CONCURRENT WRITING TO A FILE DURING BACKUP OF THE FILE

BACKGROUND

A clustered file system includes two or more computers that share the same physical disks and that communicate with one another over a network so as to present a common view of a mounted file system to applications. Such applications may include incremental backup programs or other programs that are used to move a source file system from one set of physical disks to another set of physical disks while the source file system is still mounted and updated by running applications. Such backup programs seek to read a file non-disruptively. In particular, a backup program may utilize an on-disk snapshot of a file to perform a backup of the file, while at the same time, permitting other application tasks to utilize the file without having to wait for the backup to complete.

SUMMARY

In one or more other exemplary embodiments of the disclosure, a system for concurrent writing to a file during backup of the file is disclosed. The system includes at least one memory storing computer-executable instructions and at least one processor configured to access the at least one memory and execute the computer-executable instructions to perform a set of operations. The operations include making a file system call to an owner system to request a lock to read the file, where the file is stored on a shared file system, and receiving, from the owner system, the lock to read the file. The operations additionally include generating an in-memory file snapshot that includes a copy of allocation information of the file, where the allocation information points to file data of the file stored on the shared file system. The operations further include utilizing the in-memory file snapshot to locate the file data and reading the file data.

In one or more example embodiments of the disclosure, a method for concurrent writing to a file during backup of the file is disclosed. The method includes receiving, from a first system, a first file system call to read a file stored on a shared file system, and sending, by a lock manager, a lock to read the file to the first system. The method further includes receiving, from a second system, a second file system call to write to the file, and sending, by the lock manager, a lock revoke to the first system to revoke the lock to read the file. The lock manager then receives, from the first system, a lock revoke reply that includes allocation information of the file. The method additionally includes sending, by the lock manager, a lock to write to the file to the second system, and sending, by the lock manager, the allocation information of the file to the second system to instruct the second system to perform copy-on write operations.

In one or more other exemplary embodiments of the disclosure, a computer program product for concurrent writing to a file during backup of the file is disclosed. The computer program product includes a non-transitory storage medium readable by a processing circuit, the storage medium storing instructions executable by the processing circuit to cause a method to be performed. The method includes making a file system call to an owner system to request a lock to write to the file, where the file is stored on a shared file system, and receiving, from the owner system, the lock to write to the file. The method further includes receiving, from the owner system, allocation information of the file in association with the lock to write to the file, and determining that copy-on write operations are required based at least in part on receipt of the allocation information of the file. The method additionally includes generating an in-memory snapshot data structure comprising the allocation information and performing the copy-on write operations.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
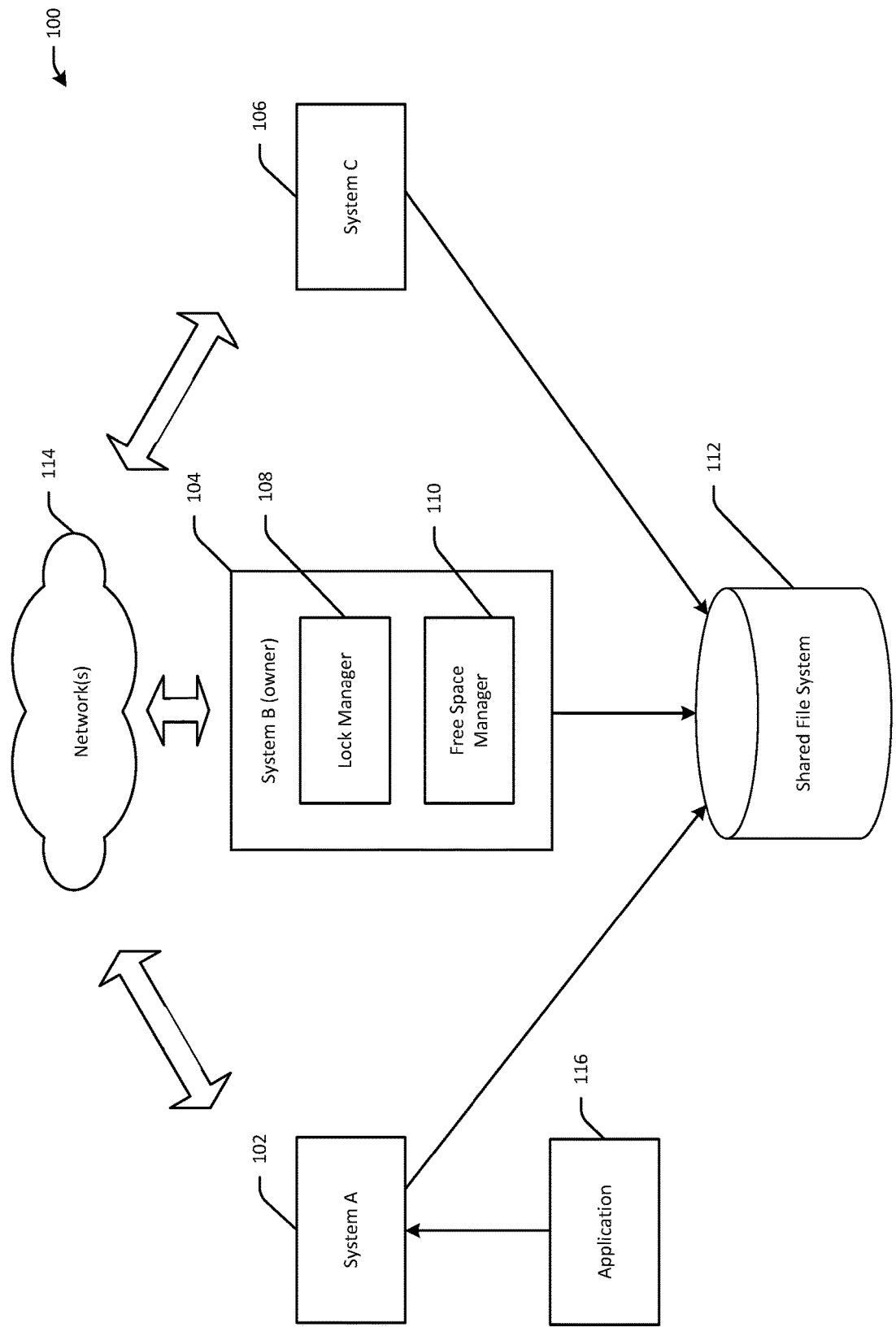
FIG. 1 is a schematic block diagram of a clustered file system to which example embodiments of the disclosure are applicable.

Example embodiments of the disclosure include, among other things, systems, methods, computer-readable media, techniques, and methodologies for generating a memory-only snapshot of a file (also referred to herein as an in-memory snapshot or a snapshotted file) that can be used by a system to perform a read of the file without disrupting other systems from reading or writing to the file, while providing a significantly reduced implementation cost and improved performance over a permanent on-disk snapshot. Example embodiments of the disclosure are applicable to, among other things, clustered file systems that include two or more computing devices that share the same physical disks and communicate over a network. The computing devices may run file system software that presents the file system as a shared tree among the devices. Programs that read files stored on the shared file system may include, without limitation, incremental backup programs, migration applications that periodically move a source file system from one set of physical disks to another, or the like.

A conventional method for allowing backup programs to read a snapshot of a file while allowing other applications to write to the same file involves creating an on-disk clone of the file. The backup program then reads the clone of the file rather than the primary file itself. There are a number of drawbacks to this approach. First, there is a performance overhead associated with creating the on-disk snapshot. Second, rather than reading the file itself, a backup program must read the on-disk clone of the file that was created, which is a hidden file that is likely not in the file directory tree. This increases implementation costs. In addition, on-disk file snapshots require updates to programs that verify the correctness of the file system and require automatic deletion of the snapshot if the system crashes and the backup program is no longer reading the file, both of which increase implementation costs.

Example embodiments of the disclosure address these and other drawbacks associated with creating on-disk clones of a file. In particular, example embodiments of the disclosure generate in-memory snapshots of files that significantly reduce the implementation costs and overhead associated with creating on-disk clones. This is achieved, at least in part, by providing a lock manager that is configured to include an additional output parameter for file locks that includes allocation information associated with the in-memory file snapshot (which informs a writer that a backup read is in-progress and that it must perform copy-on write operations), and by providing a free space manager that is configured to track pinned blocks so as to both allow a write to a file to free snapshot blocks—which ensures consistency of on-disk structures—while also preventing the freed blocks from being allocated to other files until backup read processing is complete—which ensures that the in-memory snapshot can be read without error even if the primary file is being written to.

FIG. 1 is a schematic block diagram of a clustered file system 100 to which example embodiments of the disclosure are applicable. The illustrative clustered file system 100 includes three systems 102, 104, 106 which may be referred to herein at times as System A, System B, and System C, respectively. The systems 102, 104, 106 may be connected via one or more networks 114 which may include, without limitation, a Transmission Control Protocol/Internet Protocol (TCP/IP) network, a system Z sysplex communication network, or the like. Each system 102, 104, 106 can directly read and write to files stored on physical disks of a shared file system 112. A clustered file system may also be referred to herein as a cluster, and a system within the clustered file system may be referred to as a member of the cluster.

In an example embodiment, a particular system may be responsible for lock management of objects stored on the shared file system 112. More specifically, System B 104, for example, may include a lock manager 108 that allows any member of the cluster (e.g., any of systems 102, 104, 106) to read-lock or write-lock a file or directory in the shared file system 112. A read-lock allows the requesting system to read data from an object, and a write-lock allows the requesting system to read and/or write data. In addition, a particular member of the cluster may be responsible for tracking free space in the shared file system 112 and allowing other members of the cluster to reserve space in the file system 112 for their use. In certain example embodiments, the same member of the cluster may be tasked with lock management and free space management. Such a member may be termed an owner, as illustratively depicted with System B 104 in FIG. 1. In particular, owner System B 104 may include the lock manager 108 configured to perform lock management and a free space manager 110 configured to perform free space management. However, it should be appreciated that lock management and free space management may be distributed among multiple members of a cluster. For example, in certain example embodiments, which system(s) serves as the lock manager and/or the free space manager may vary based on file attributes, attributes of the requesting system/application, and so forth.

Applications can make a call to the shared file system 112 via the system on which they are running. For example, application 116 may make a call to System A 102 to access the shared file system 112. The file system 112 may need to obtain a lock from the owner System B 104 (if not already held) and/or reserve blocks from the free space manager 110 (if not already reserved) and can directly read and write to a physical disk. In certain example embodiments, the application 116 may be a backup application or a migration application used to move file systems from one set of physical disks to another set of physical disks. In either case, the application 116 requires a point-in-time snapshot of the file when it begins the process of reading the file for backup or migration. While a backup application may be referenced in describing example embodiments of the disclosure, it should be appreciated that such embodiments are applicable to any application seeking to read a file.

Figure 2:
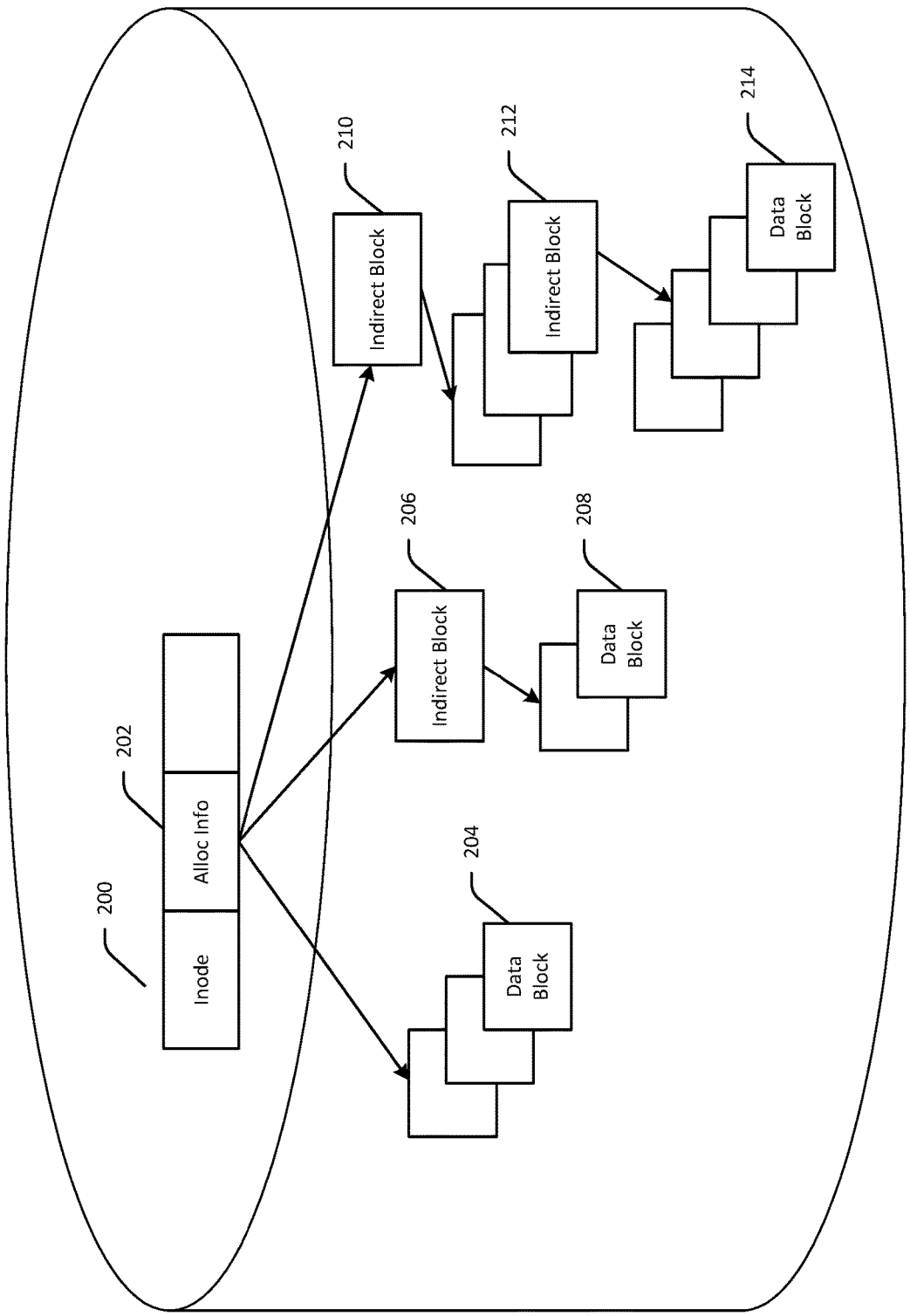
FIG. 2 is a schematic diagram of an example file system structure in accordance with one or more example embodiments of the disclosure.

FIG. 2 is a schematic diagram of an example file system structure. More specifically, FIG. 2 depicts how files may be stored on disks in a Portable Operating System Interface (POSIX) file system. In POSIX file systems, a data structure 200 (referred to as an inode) that describes a file or directory may be stored on disk. The inode 200 may be stored in a table that can be indexed using an inode number to locate the file in the table. A file system disk is conceptually an array of records (sometimes called sectors or blocks), numbered from 0 to N−1. A file is also conceptually an array of logical records and internally the file system may use mapping structures to locate the data for that file inside the file system.

The inode 200 may include allocation information 202. The allocation information 202 may include the length of the file, the amount of space allocated on disk for the file, and pointers to the location of the file data on disk. In certain instances, files can be sparse such that regions of the file that are logically zero are not stored on disk, and thus, would not be identified in the allocation information 202. Different file systems may use different structures for locating the data of a particular file in the file system disks. Some file systems might use B+ trees that are essentially balanced trees where each node is a (logical record, physical record, length) triple.

Other file systems, including the example file system structure depicted in FIG. 2, use indirect blocks and indirect block trees to locate the data. In certain example embodiments, the inode 200 may list the first few records for the file. For example, as shown in FIG. 2, the allocation information may directly point to or otherwise include an indication of one or more data blocks 204 of a file. If the file is small in size, the allocation information 202 may include a direct reference or pointer to each data block of the file. If, however, the file is larger (e.g., above a threshold size), indirect block trees may be used to map the file locations.

Each node in an indirect block tree may be an array of slots, where each slot points to a lower level indirect block or a data block of the file. For sparse files, un-written regions of the file do not need to be allocated, and as such, not all slots may be filled in the mapping array. Very large files may have indirect block trees associated therewith. The number of levels in an indirect block tree may vary based on the file size. In general, the location of a data block of a file may be found by traversing a branch of an indirect block tree to find the leaf indirect block that points to the data block of the file. For example, for a smaller indirect block tree, the allocation information 202 may directly point to a lead indirect block 206 which, in turn, points to a data block 208 of the desired file. For larger indirect block trees, the allocation information 202 may point to an indirect block 210 which, in turn, points to one or more additional indirect blocks. The branches of the indirect block tree may be traversed through these additional indirect block(s) until a leaf indirect block 212 is reached that points to a data block 214 of the file.

Figure 3:
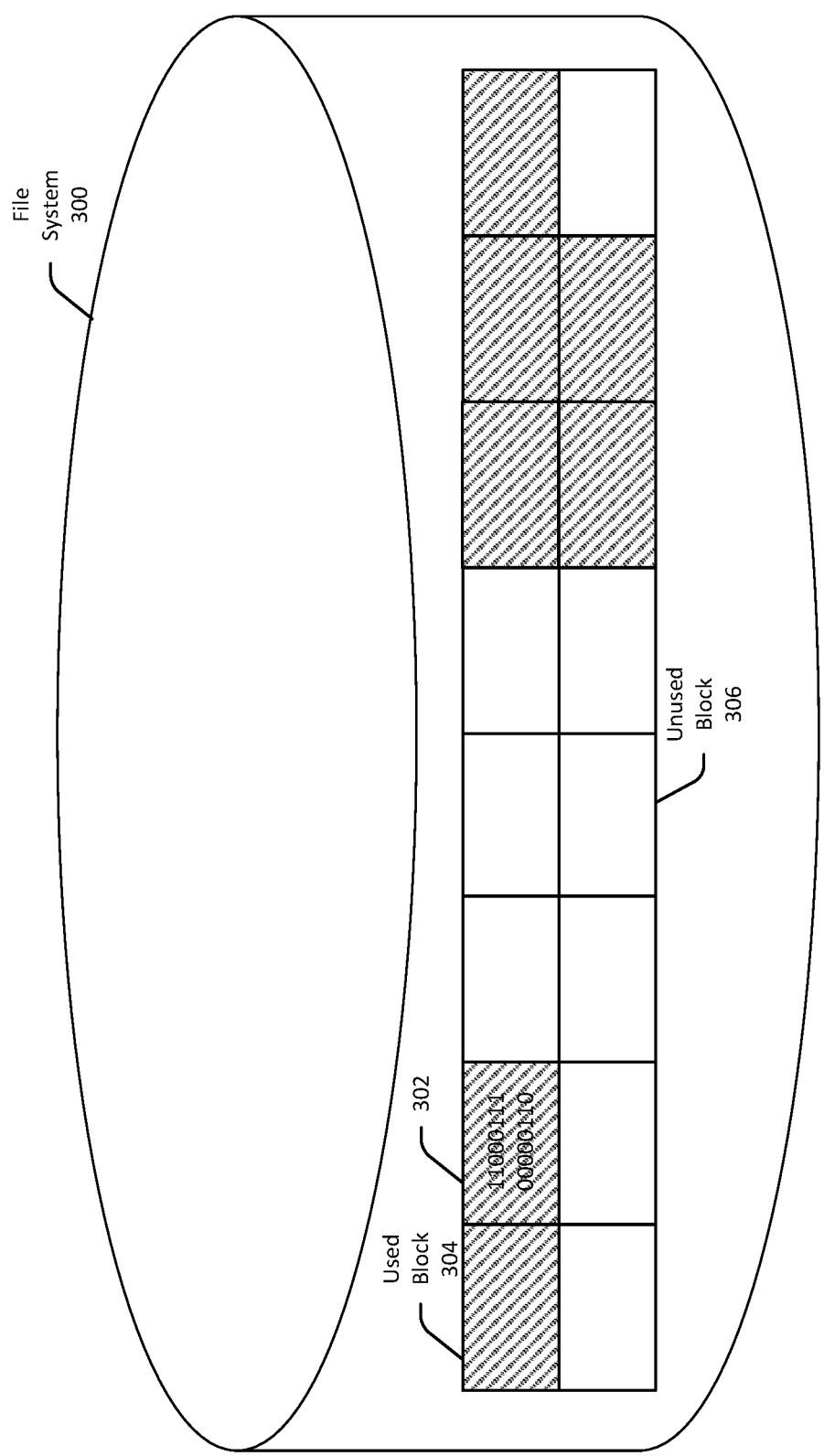
FIG. 3 is a schematic diagram of a file system disk and free space management structures used on the disk in accordance with one or more example embodiments of the disclosure.

FIG. 3 is a schematic diagram of a file system disk and free space management structures used on the disk. As previously noted, a file system disk may be conceptualized as an array of equal sized records. Some file systems, such as file system 300 depicted in FIG. 3, might logically organize such records into larger units referred to as blocks. A file system requires a mechanism for determining which blocks of the file system are unused, and therefore, eligible for use for data of new files or directories. Various mechanisms may be used to track which blocks are available. Some file systems, for example, use B+ trees to track available regions in a file system, where the leaf nodes of a B+ tree represent free regions expressed as (physical record number, length) doubles.

In another mechanism, such as that depicted in FIG. 3, a file system utilizes a bit array (also referred to as a bitmap), where each bit in the bitmap indicates whether a corresponding block is free. One or more blocks in the file system may contain such bitmaps. As shown in FIG. 3, for example, block 1 302 (counting from the leftmost topmost block and starting at 0) is a bitmap block containing an array of bits. A bit set to 1 in the bitmap indicates that a corresponding block is in-use. Conversely, a bit set to 0 in the bitmap indicates that a corresponding block is free. The patterned blocks depicted in FIG. 3 are in-use while the non-patterned blocks are available. For example, the bitmap contained in bitmap block 302 indicates that block 0 is a used block 304 and block 11 is an unused block 306.

Various illustrative methods of the disclosure and corresponding data structures used in connection with the methods will now be described. It should be noted that each operation of any of the methods 800-1100 may be performed by one or more of the engines, managers, or the like depicted in FIGS. 1-7 and 12, whose operation will be described in more detail hereinafter. These engines, managers, or the like may include one or more program modules that may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 4:
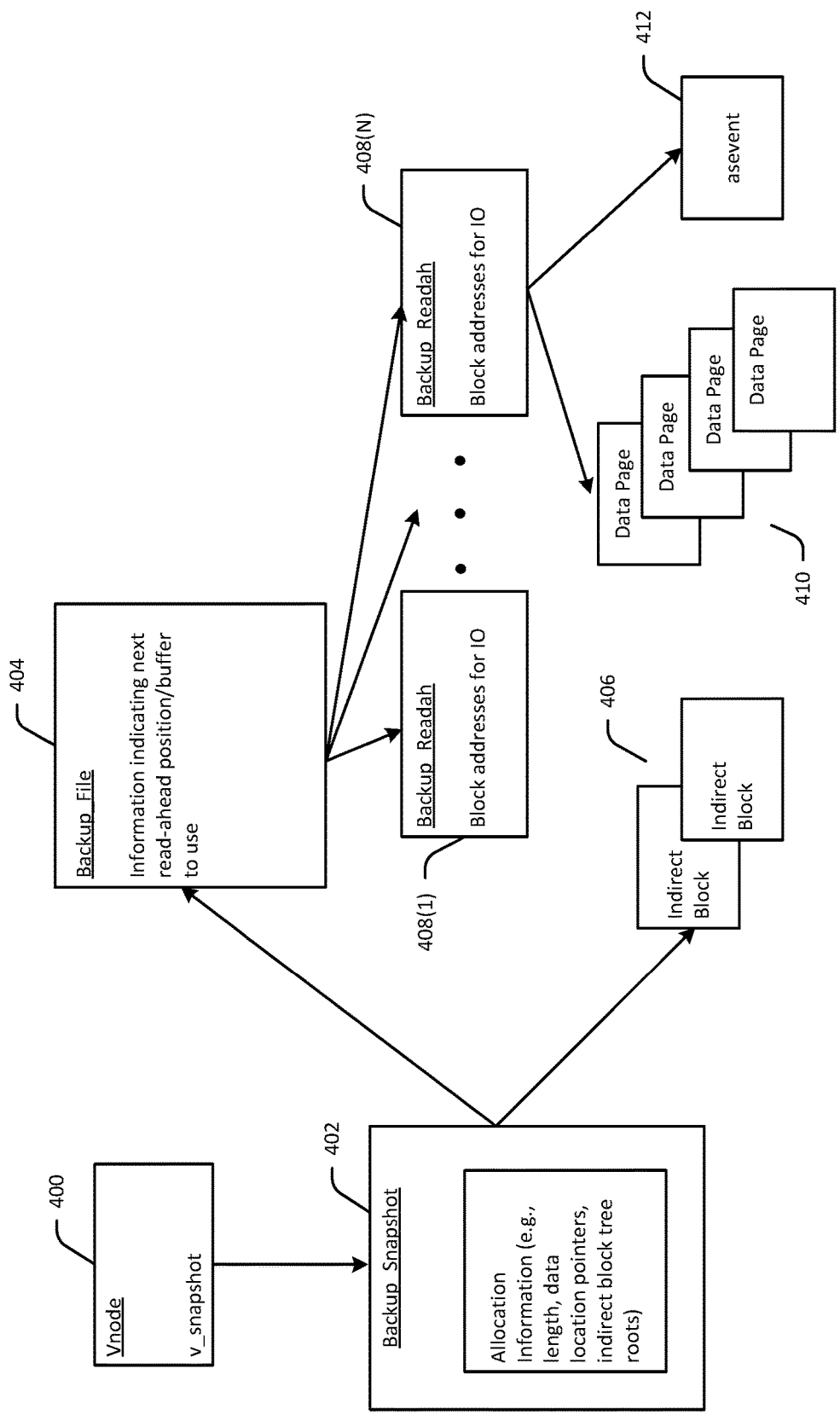
FIG. 4 is a schematic diagram of data structures used to provide support to an application when reading a file in accordance with one or more example embodiments of the disclosure.
Figure 8:
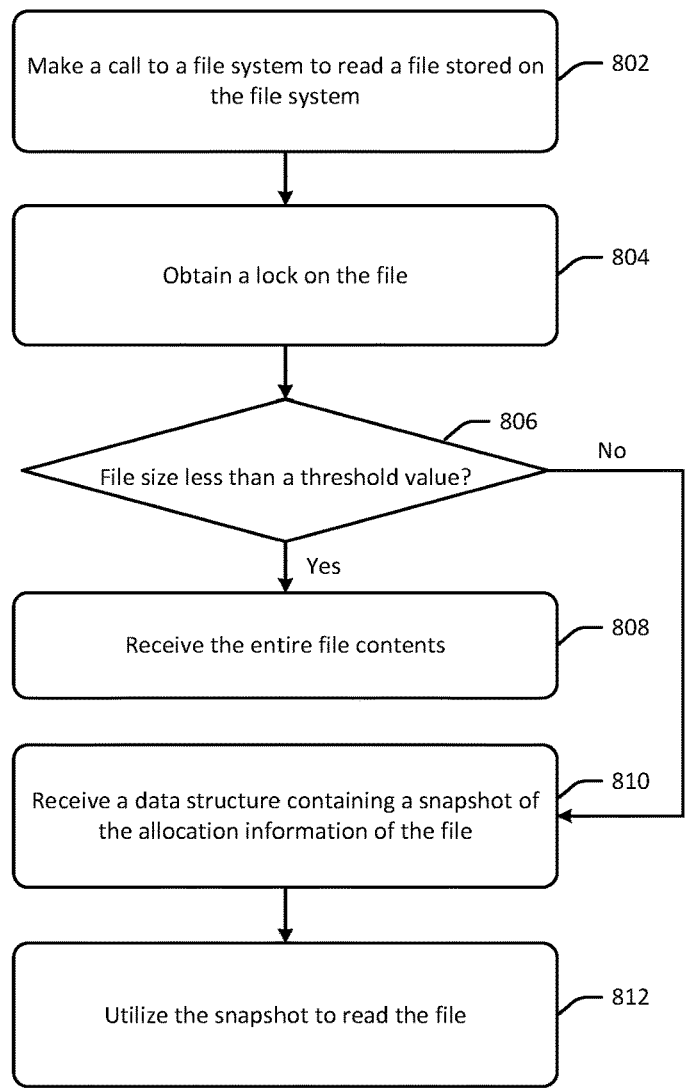
FIG. 8 is a process flow diagram of an illustrative method for utilizing an in-memory snapshot of a file to read the file in accordance with one or more example embodiments of the disclosure.

FIG. 4 is a schematic diagram of the data structures used to provide support to an application when reading a file. FIG. 8 is a process flow diagram of an illustrative method 800 for utilizing an in-memory file snapshot to read a file. The method 800 and corresponding data structures used in the method 800 provide an interface (a backup-read function) that allows a backup application, migration application, or the like to read an open file using an in-memory virtual snapshot of the file. FIGS. 4 and 8 will be described in conjunction with one another hereinafter.

Referring first to FIG. 8, at block 802, an application such as a backup application or a migration application may make a call to a file system (e.g., the file system 112 depicted in FIG. 1) to a read a file stored on the file system. As previously noted, the application may make the call to the file system via the cluster system on which it is executing. At block 804, the system on which the application is executing obtains a lock on the file from a lock manager if not already held by the system. The process for obtaining a lock on a file will be described in more detail later in this disclosure.

At block 806, the cluster member on which the application is executing (or in some cases the cluster owner which may be a different system than the cluster member on which the application is executing) may determine whether the file size is less than a threshold value. The threshold value may be a value that represents a demarcation between a file size that is considered to be 'small' and a file size that is considered to be 'large.' In one or more example embodiments, the threshold value may be 64K bytes. In response to a positive determination at block 806, the entire contents of the file may be transferred to the requesting application at block 808 and no snapshot is generated. On the other hand, in response to a negative determination at block 806, the allocation information of the file is snapshotted and saved in a backup_snapshot data structure 402, as shown in FIG. 4.

The requesting application receives the backup_snapshot data structure 402 at block 810, and may utilize the snapshot to perform a read of the file at block 812.

As previously noted, FIG. 4 depicts data structures that are used to provide support to an application when reading the file. FIG. 4 depicts a vnode 400, which is a data structure in memory that describes a file or directory. The vnode 400 may be an in-memory representation of the file that is being read in method 800, whereas the inode 200 depicted in FIG. 2 may be an on-disk representation of the file. The vnode 400 may include a pointer to the on-disk inode 200. The vnode 400 may include multiple fields, one of which may include a pointer to the in-memory backup_snapshot structure 402 that contains a copy of the allocation information of the file at the time of the start of the first read.

The backup_snapshot structure 402 may also include a pointer to a backup file 404 that includes information indicating the next read-ahead position/buffer for the application to use to read the file. In addition, the application may utilize the allocation information in the backup_snapshot structure 402 to identify and cache indirect block branches 406 of the file so as to avoid repeatedly having to read the indirect block branches in connection with mapping the logical file locations associated with the indirect block branches to physical locations of the file data.

More specifically, for large file sizes, asynchronous read-ahead may be performed for up to N (e.g., 8) regions of the file sequentially. When the IO for the first regions is complete, the read output may be transferred to the backup application memory. The backup application may then receive the offset for the next set of regions to read in the file and may be instructed to re-call the file system to request the next set of regions.

FIG. 4 depicts a sequence of backup_readah data structures 408(1)-408(N) that may be used to perform a sequential read-ahead of the file. Each backup_readah structure represents a pending 10 (and hence a set of memory buffers) used to contain a next region of the file, as represented by the data pages 410. More specifically, each backup_readah structure may contain data from a particular region of the file that is copied from disk to memory ahead of being requested by and provided to the backup application. The backup application may loop through the backup_readah structures 408(1)-408(N) requesting the next region over and over again until the entire file is processed.

The file system may aggressively schedule asynchronous read-aheads of file regions and may be optimized to skip empty (sparse) regions of the file. FIG. 4 also depicts an asevent data structure 412 that may be pointed to by a backup_readah structure (e.g., 408(N)) and that may represent a pending disk IO. It should be noted that for the backup-read processing, the backup_snapshot structure 402 contains the allocation information (length and data pointers) of the file at the time of the snapshot and not the current data pointers as stored in the inode 200. As such, the backup-read processing is not impacted by concurrent writes to the file.

Figure 5:
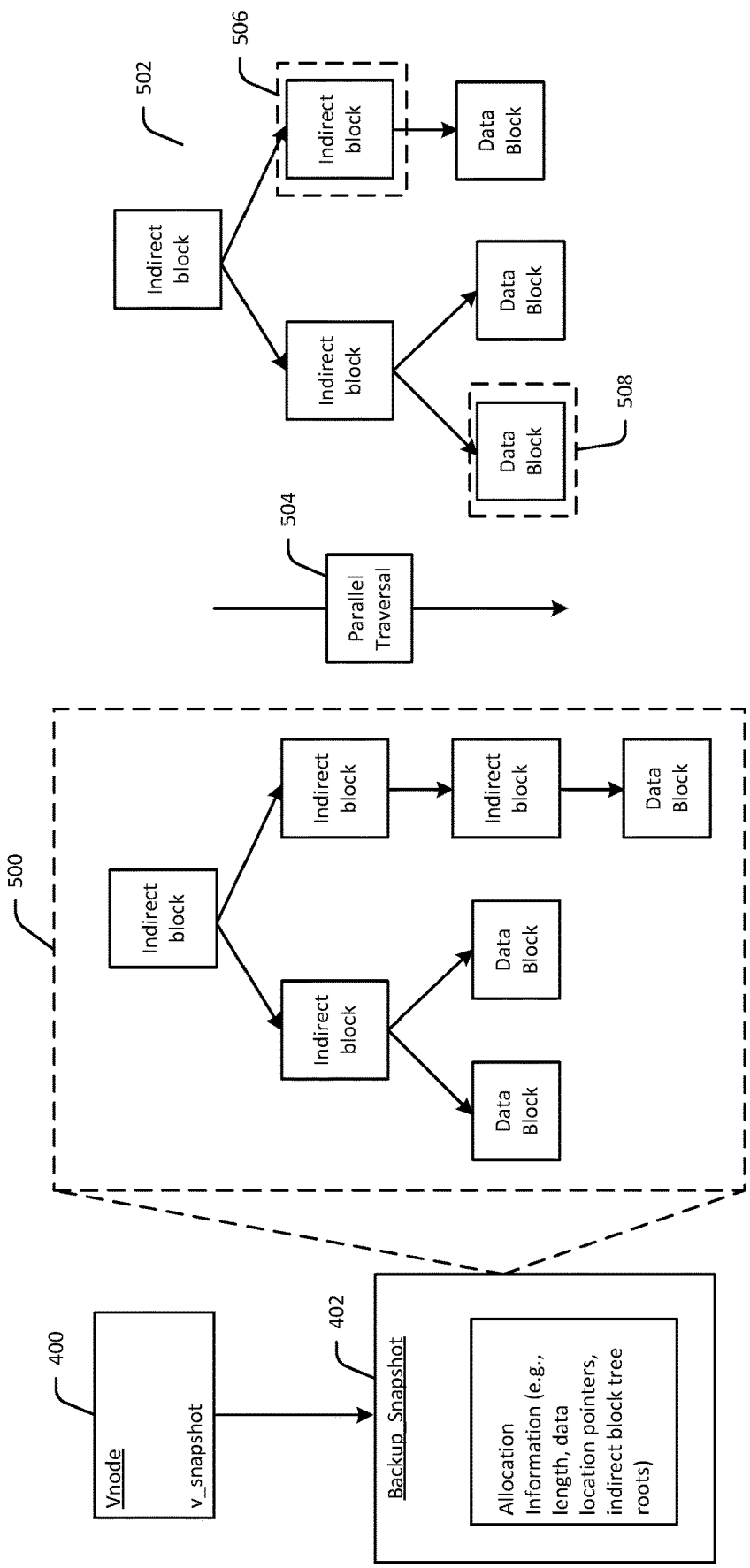
FIG. 5 is a schematic diagram illustrating a parallel traversal of a snapshot indirect block branch and an indirect block branch of a primary file to identify new indirect block(s) and/or new data block(s) to be reserved in connection with a write operation in accordance with one or more example embodiments of the disclosure.
Figure 9:
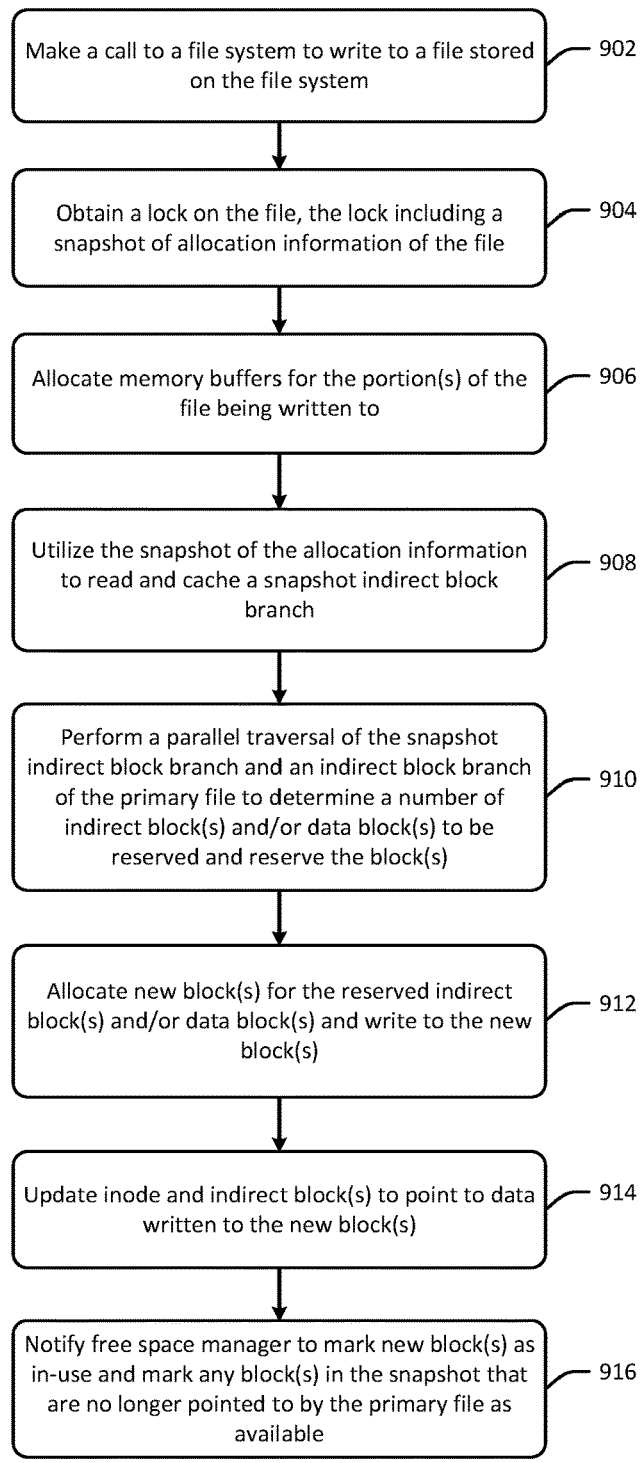
FIG. 9 is a process flow diagram of an illustrative method for performing a copy-on write operation for a file while an application is utilizing an in-memory snapshot to perform a read of the file in accordance with one or more example embodiments of the disclosure.

FIG. 5 is a schematic diagram illustrating a parallel traversal of a snapshot indirect block branch and an indirect block branch of a primary file to identify new indirect block(s) and/or new data block(s) to be reserved in connection with a write operation. FIG. 9 is a process flow diagram of an illustrative method 900 for performing a copy-on write operation for a file while an application is utilizing an in-memory snapshot to perform a read of the file. FIGS. 5 and 9 will be described in conjunction with one another hereinafter.

Referring first to FIG. 9, at block 902, a cluster member on which an application seeking to write to a file is executing may make a call to a file system (e.g., the file system 112 depicted in FIG. 1) and request a lock on the file. If the cluster member on which the application is executing also includes a lock manager, then the cluster member itself may provide the lock to the requesting application. Alternatively, if a different cluster member (e.g., a cluster owner) contains the lock manager, the cluster member on which the application is executing may contact the cluster owner to obtain the lock. At block 904, the application may obtain the lock on the file. The lock may include a snapshot of allocation information of the file. The inclusion of the snapshot of the allocation information with the lock indicates to the application seeking to write to the file that another application (e.g., a backup application) is currently reading the file, and that the application seeking to write will have to employ copy-on write techniques for every write to the file until it is notified by the lock manager that the backup application has completed reading the file.

Figure 10:
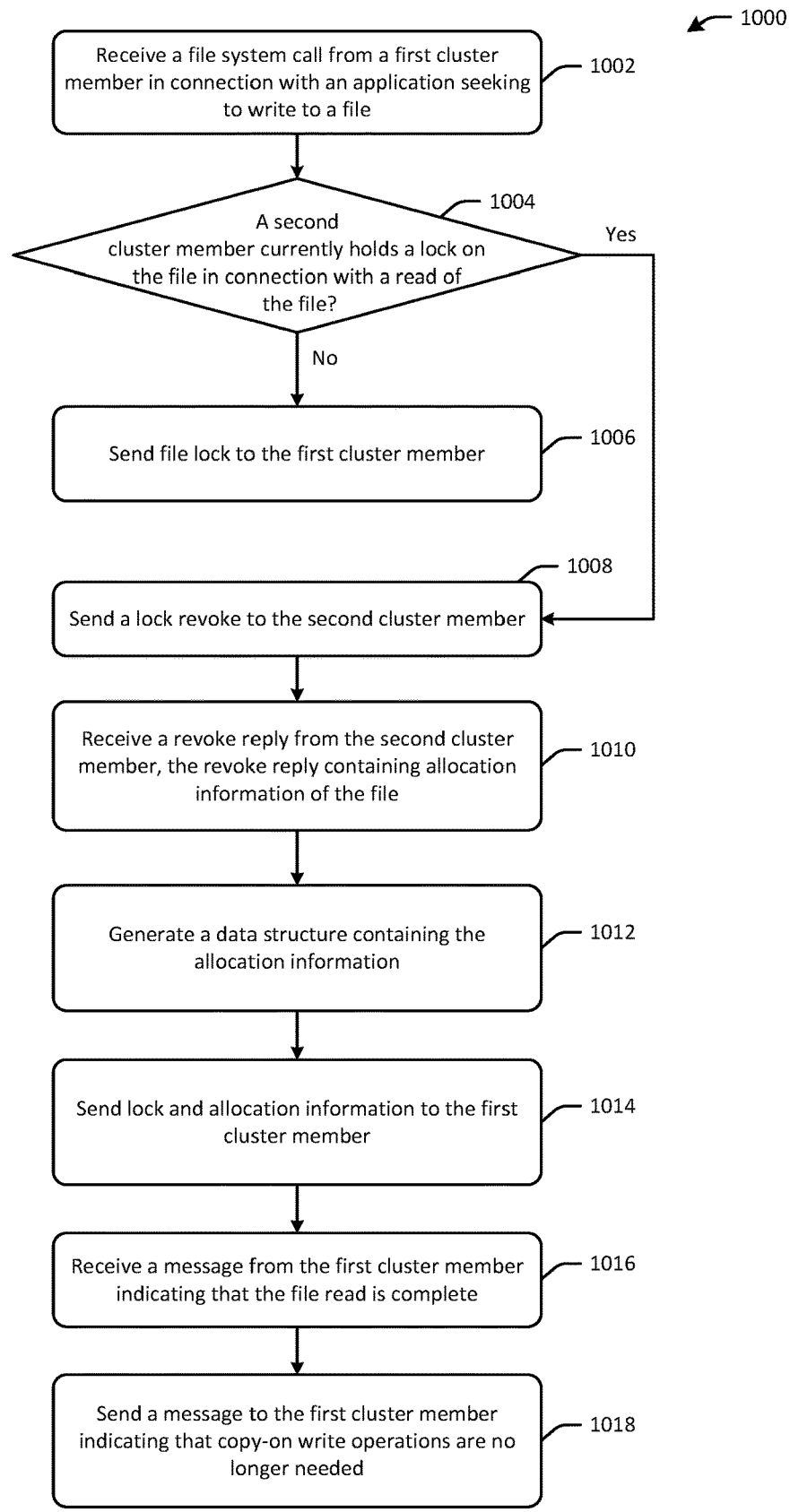
FIG. 10 is a process flow diagram of an illustrative method for determining, upon revocation of a lock to a first system, that the first system is currently reading a file using an in-memory snapshot of the file, and informing a second system seeking to write to the file that it should utilize copy-on write techniques by sending allocation information of the file in connection with a grant of a lock to the second system in accordance with one or more example embodiments of the disclosure.

The process by which a lock manager, in accordance with one or more example embodiments of the disclosure, revokes a lock currently held by an application reading a file and grants a lock to an application seeking to write to the file in such a manner so as to inform the application seeking to write that it must employ copy-on write techniques will be described in more detail in reference to FIGS. 7 and 10. In particular, a lock manager in accordance with example embodiments is configured to inform the application seeking to write that it must employ copy-on write techniques by returning allocation information of a file snapshot in connection with the grant of a lock to the application.

At block 1002, a lock manager may receive a file system call made by the system at block 902 of the method 900. At block 1004, the lock manager may determine whether another application such as a backup application or migration application is currently reading the file. FIG. 7 depicts various lock manager structures that may be utilized by the lock manager in connection with the method 1000. The lock manager may utilize a tkm_file structure 700 to represent the file. In addition, the lock manager may utilize a respective zfs_host structure to represent each system in the cluster. For example, assuming the cluster has three systems (System A, System B, and System C), the lock manager may utilize a zfs_host structure 708 to represent System A, a zfs_host structure 710 to represent System B, and a zfs_host structure 712 to represent System C.

A lock 706 granted by the lock manager points to the system that holds the lock. Generally speaking, if a backup application reads a file and no other system in the cluster attempts to write to the file, the lock manager has no knowledge of any file snapshot structures that have been generated. In particular, if a backup application executing on System A, for example, requests to read a file, System A will generate a backup_snapshot structure (e.g., the back_up snapshot 402 depicted in FIG. 4) that contains a copy of the allocation information of the file. Assuming that no other cluster member is writing to the file, then the backup application can continue reading the file utilizing the snapshot of the allocation information until it completes reading the file. Upon completion, memory blocks storing backup-related structures (e.g., the backup_snapshot 402, the cached indirect block branches 406, the backup_file 404, etc.) may be freed.

However, if a member of the cluster attempts to write lock the file, the lock manager needs to send a revoke to the system that is performing the backup read. In an example scenario, the backup application and the application seeking to write to a file may be executing on the same cluster member (e.g., System A). In such an example scenario, the backup application may request to read a file, obtain a lock on the file from the lock manager, and generate the backup snapshot structures needed to read the file, as described earlier. Then, when a first writer on the same cluster system (System A) seeks to write to the file, System A (which is already aware of the backup in progress on System A) generates copy-on-write structures and performs a copy-on write, as will be described in more detail in reference to FIGS. 5 and 9. Further, because System A is aware that the file has been written to, when the backup read is completed, System A may send a message to the free space manager (which may reside on a different system such as the cluster owner) so that blocks that have been pinned as a result of the copy-on write can be freed. This process for pinning and freeing pinned blocks will be described in more detail later in this disclosure in reference to FIGS. 6 and 11.

Referring again to FIG. 10, in response to a negative determination at block 1004, which indicates that no application is currently reading the file, the lock manager simply issues a lock to the system seeking to write to the file, at block 1006. The process flow of the method 1000 that occurs in response to a positive determination at block 1004, however, describes a more complex scenario than the other scenarios described above. In particular, the process flow of the method 1000 in response to a positive determination at block 1004 describes a process for handling scenarios in which a backup is occurring on a first cluster member (e.g., System A) and a write is requested on a different cluster member (e.g., System C). System B is assumed to be the cluster owner on which the lock manager and the free space manager may reside in various exemplary embodiments of the disclosure.

In response to a positive determination at block 1004, the lock manager may send, at block 1008, a lock revoke to the system on which the backup application is executing (System A). It should be noted that the backup application may have obtained the lock on the file from the cluster owner (e.g., System B) in response to a prior request to read the file for backup and may have generated the in-memory snapshot structures (e.g., the backup_snapshot structure 402 depicted in FIG. 4 containing a copy of the allocation information of the file) to facilitate reading of the file. Because the application seeking to write to the file is assumed to be executing on a different cluster member (e.g., System C), and System C does not have a write lock on the file, System C must obtain the lock from the lock manager on the owner (e.g., System B). In order to grant the lock to System C, the cluster owner (System B) must first revoke the lock held by System A (the cluster member on which the backup application is performing the backup read).

System A may receive the lock revoke, and because snapshot structures have been generated and a backup read is in-progress, System A includes the allocation information of the file in a reply to the lock revoke. The revoke-reply containing the allocation information of the file may be received by the lock manager at block 1010. It should be noted that the backup read is not affected by the loss of the lock because it has a copy of the allocation information that provides access to the original, unchanged data of the file.

Figure 7:
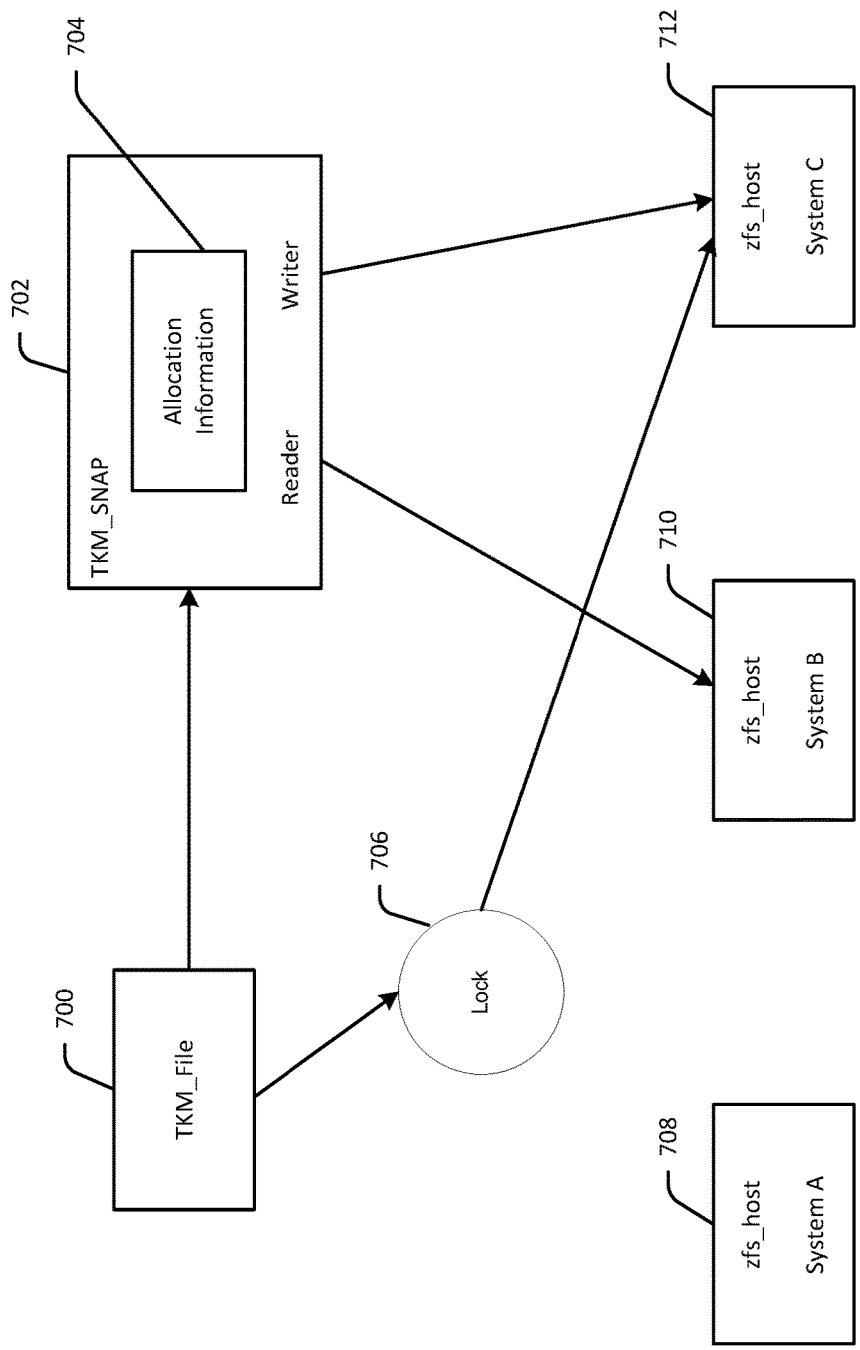
FIG. 7 is a schematic diagram of lock manager data structures in accordance with one or more example embodiments of the disclosure.

The inclusion of the allocation information of the file with the revoke-reply indicates to the lock manager that a backup read is in progress, and the lock manager, at block 1012, generates a tkm_snap structure 702 depicted in FIG. 7 and caches the allocation 704 information in the tkm_snap structure 702. The tkm_snap structure 702 may be pointed to by the tkm_file structure 700 that represents the file in the lock manager. The tkm_snap structure 702 may also include an identification of the system performing the backup (System A) and the current writer that holds the write lock (System C) on the file system. This allows for the lock manager to inform the system requesting the lock 706 (System C) of the in-progress backup on System A by providing System C with the allocation information in connection with the grant of a lock 706 on the file. In particular, because System C is required to perform copy-on-write operations as a result of the in-progress backup read, the lock manager returns, at block 1014, the allocation information 704 to System C along with the lock 706 on the file. Because System C receives the allocation information 704 with the lock reply from the owner (System B), System C is aware that it must perform copy-on write operations and caches the allocation information. System C performs the copy-on-write operations until its applications are done writing to the file or until it receives a snapshot close message from the owner.

In particular, at some point, the backup application executing on System A completes its processing of the file. Because System A received a revoke of its lock, it knows that it must contact the owner (System B) to inform System B that the backup is complete. In particular, the owner (System B), or more specifically, the lock manager residing thereon, may receive, at block 1016, a message from System A indicating that the backup read processing is complete. Then, at block 1018, the lock manager may send a message to System C (the holder of the write lock) to inform System C that the snapshot is closed and that copy-on-write is no longer required. The owner (System B), or more specifically, the free space manager residing thereon, may then free any pinned blocks for the file, as will be described in more detail in reference to FIGS. 6 and 11.

In certain example embodiments, System C may receive the snapshot close message at block 1016 prior to receiving the reply to its lock request. In such an example scenario in which System C receives a snapshot close message for a file for which a write-lock is pending from the lock manager, System C caches a snapshot identifier included in the snapshot close message. The lock manager previously received the snapshot identifier from System A along with the allocation information included with the revoke-reply received from System A. The snapshot identifier may be a unique identifier that serves to distinguish between snapshot close races. When System C receives a write-lock reply from the lock manager that includes snapshot allocation information, System C first checks for a snapshot close race condition by comparing the received identifier to any previously cached snapshot identifiers to determine whether copy-on-write operations are in fact required. If the identifier received in the write-lock reply matches a previously cached snapshot identifier, System C knows that copy-on write operations are not required. Performing copy-on-write when unnecessary would be wasteful of computing resources, so the race check described above prevents unnecessary copy-on-write operations that may otherwise result from differences between the timing of the writer activity and the backup application activity.

Referring again to FIG. 9, the copy-on write process depicted therein includes a delayed allocation feature where new regions of a file are not assigned their permanent disk locations until the data is transferred from memory to disk. Once the IO is complete, the Mode and indirect blocks (or however the file system represents the location of data on disk) are updated to reflect these new blocks of the file. Thus, when an application performs a write to the file, blocks might be reserved to ensure there is space for the file data, but the permanent locations are not assigned until the disk IO is issued. When a snapshot is present (a system in the cluster is reading the file for backup using the backup-read protocol), the writing system, which might be the same system as the one reading the file or a different system entirely, performs copy-on-write techniques to ensure that the original blocks of a file region are preserved as they were at the time of the snapshot. In one or more example embodiments of the disclosure, cluster locking permits no more than one system to have a write lock on a file at one time, and thus, only one system at a time in the cluster could be writing to the file.

A system that is processing a write to a file that is undergoing a backup performs three phases: a reservation phase, a disk-writing phase, and an IO complete phase. After obtaining a lock on the file as described earlier, the writing system initiates the reservation phase by allocating, at block 906, memory buffers (if not already present) for the affected region of the file in its caching system. The writing system then determines if block reservations are required. More specifically, at block 908, the writing system utilizes the snapshot of the allocation information that is received in connection with the write lock to read and cache an indirect block branch 500 of the snapshotted file. Then, at block 910, the writing system performs a parallel traversal 504 of the snapshot indirect block branch 500 and an indirect block branch 502 of the primary file (which reflects memory locations at which new data is to be written to the file) to determine if new indirect block(s) and/or new data block(s) are required to be reserved.

A new reservation is required if a snapshot indirect block has the same physical address as an indirect block of the primary file or if a data block address in the snapshot indirect block branch matches a data block address in the indirect block branch of the primary file. Additionally, as a result of storing indirect blocks in trees, if a slot in an indirect block tree branch of the primary file matches a slot in the corresponding snapshot indirect block tree branch than a snapshot indirect block corresponding to that slot cannot be altered and a copy of it should be made. Thus, a tree branch traversal is performed at block 910 to count the number of indirect block(s) 506 and/or data block(s) 508 that need to be reserved for copy-on-write operations. A reservation is then made for these new blocks(s). The above process is repeated for each indirect block branch of the snapshot and each corresponding indirect block branch of the primary file.

Once the new block(s) have been reserved, the writing system transitions to the disk-writing phase. At block 912, the writing system allocates new block(s) for the reserved indirect blocks(s) and/or data block(s) and writes the data to these new block(s). It should be noted that the file system remembers which blocks in the snapshotted file are being replaced (which blocks copy-on-write operations have been applied to) in order for the free space manager to make those blocks available after a backup read of the file is complete. At block 914, after completion of the IO, the file system, as part of the IO complete phase, updates the Mode of the file and updates any indirect blocks that have been written to so that they now point to the new data.

In addition, at block 916, the free space manager is notified to mark as in-use any new block(s) that were allocated for indirect block(s) and/or data block(s) for the IO and to mark as available, in the on-disk bitmap for example, any block(s) in the snapshot that are no longer pointed to by the primary file (as a result of the copy-on-write). As will be described in more detail hereinafter in reference to FIGS. 6 and 11, the free space manager passes parameters to the routine responsible for marking blocks to pin any block(s) in the snapshot that are no longer pointed to by the primary file so that these block(s) are not available for reservation/allocation until the backup reading processing of the file is complete.

Figure 6:
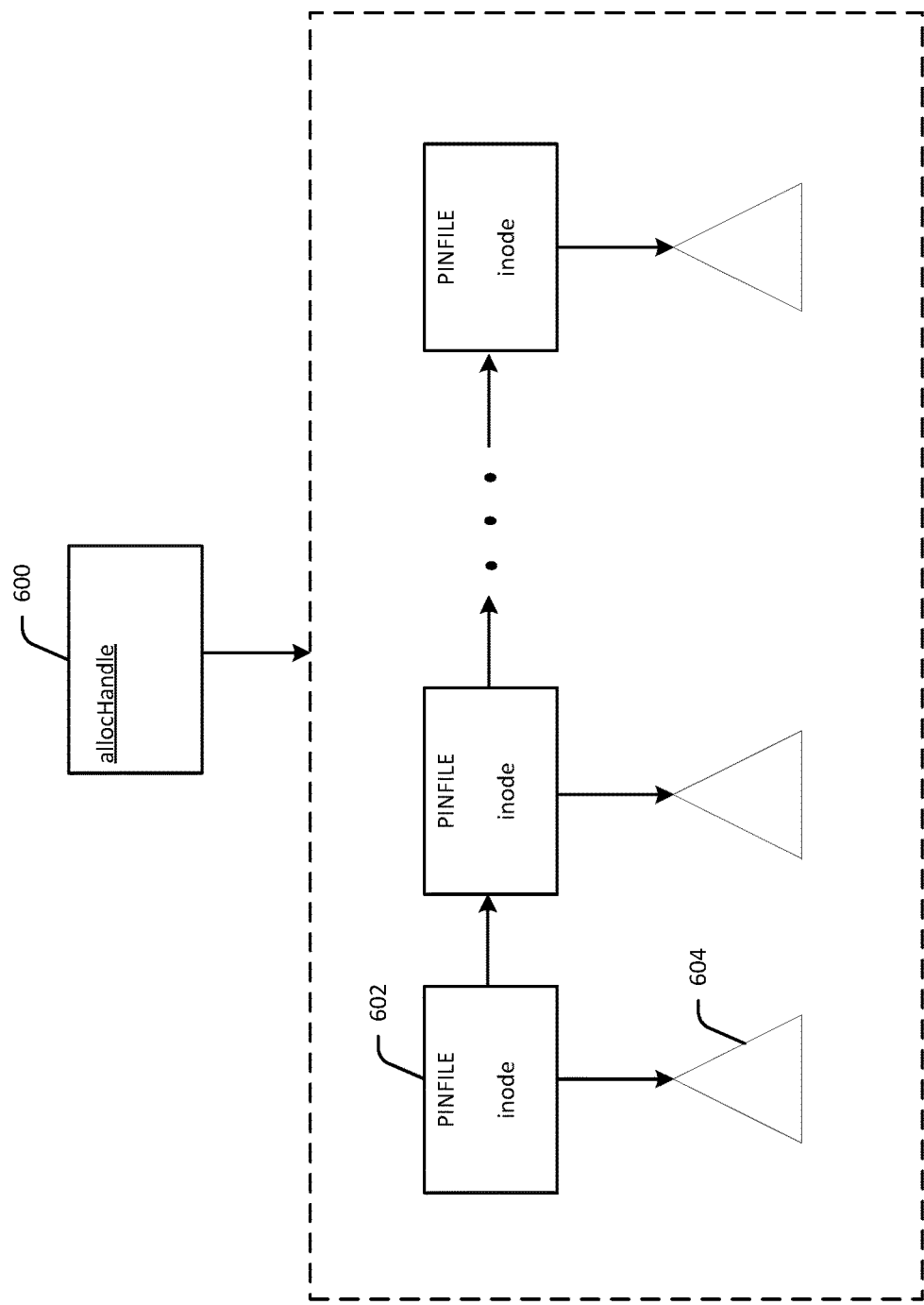
FIG. 6 is a schematic diagram of data structures used to pin, while a read of a file is occurring, blocks that are to be freed as a result of a write to the file in accordance with one or more example embodiments of the disclosure.
Figure 11:
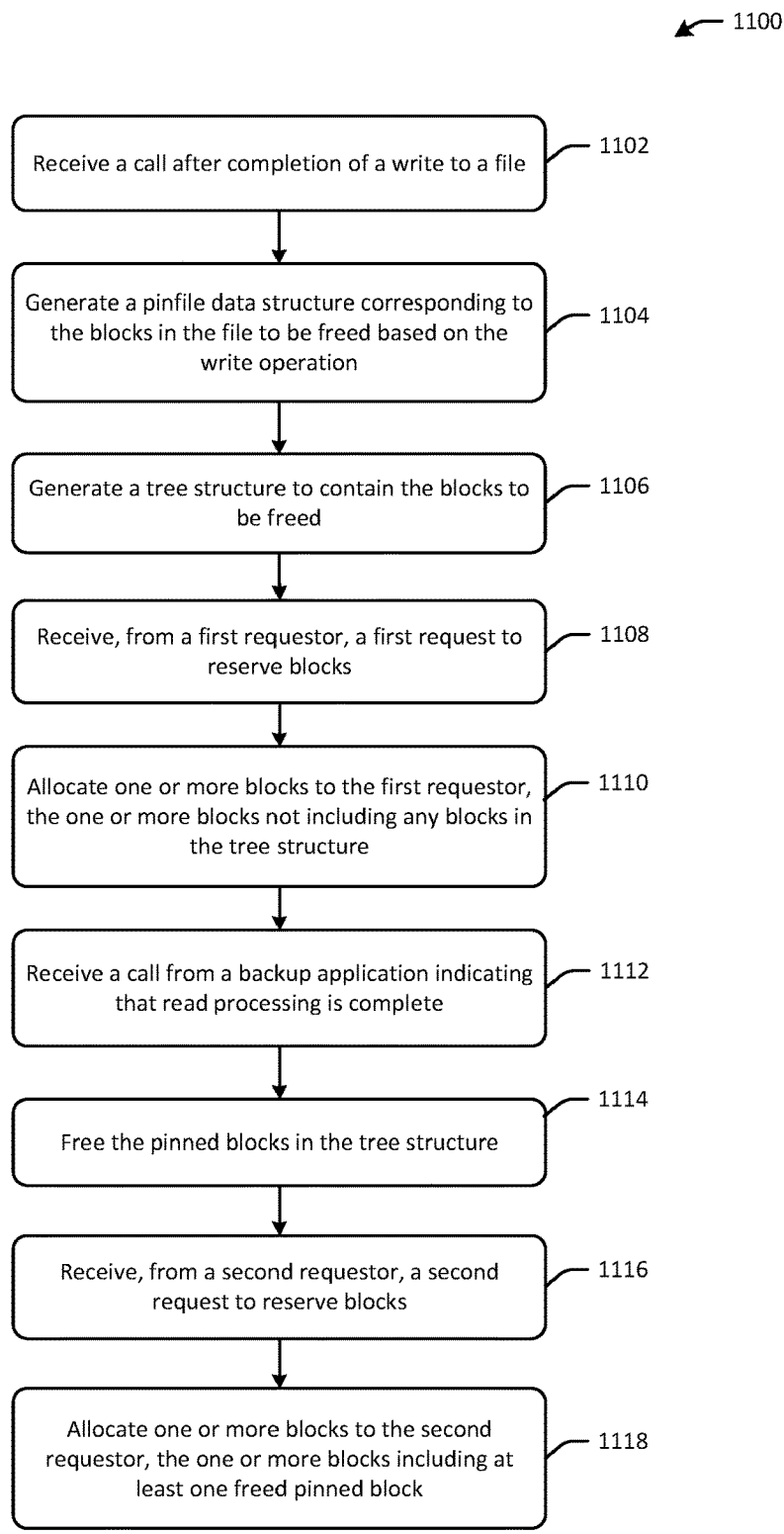
FIG. 11 is a process flow diagram of an illustrative method for pinning blocks to be freed as a result of a write operation on a file and releasing the pinned blocks upon completion of backup read processing of the file in accordance with one or more example embodiments of the disclosure.

FIG. 6 is a schematic diagram of data structures used to pin, while a read of a file snapshot is occurring, blocks to be freed as a result of a write to the file. FIG. 11 is a process flow diagram of an illustrative method for pinning blocks to be freed as a result of a write operation on a file and releasing the pinned blocks upon completion of backup read processing of the file. FIGS. 6 and 11 will be described in conjunction with one another hereinafter.

At block 1102, the free space manager receives a call upon completion of a file disk IO corresponding to a backup read. At block 1104, the free space manager creates a pinfile data structure 602 if such a structure has not already been created for the file whose blocks are being freed. More specifically, the free space manager utilizes an allocHandle data structure 600 to manage the marking of blocks as available. The allocHandle data structure 600 anchors various structures in memory that are used to keep track of free blocks. The allocHandle data structure 600 may point to the pinfile data structures that have been generated including the pinfile data structure 602. In particular, in certain example embodiments, the pinfile data structures may be stored in a linked-list or other suitable data structure and the allocHandle data structure 600 may point to the linked-list. In addition, the on-disk bitmap also contains information on which blocks are free.

The pinfile data structure 602 is identified by the file's Mode number. Additionally, at block 1106, the free space manager generates a tree structure 604 (e.g., an empty B+ tree) to contain freed blocks of the file. The pinfile data structure 602 may point to the B+ tree 604. It should be appreciated that a corresponding pinfile data structure and B+ tree may be generated for each file that undergoes a write while a backup-read is in progress.

Each node in the B+ tree 604 is a range (start and end) of physical block locations freed for the file. The leaf nodes in the B+ tree 604 may be stored in a doubly-linked list to allow for left and right traversal of the tree 604. The B+ tree 604 may be populated as follows. For each block being freed, a search is performed for the entry whose first block is less than or equal to the input block number. A check is then performed to determine if the block being freed is adjacent to the range of blocks in the located node (if any), and if so, the current leaf node is adjusted to include in its range the block being freed. In certain example embodiments, a merge with the next leaf node in the tree 604 can possibly be made if the merge would result in uniting two previously disjoint ranges. In the case of a merge, the next node is deleted from the tree 604, and the end number of the prior node is set to the end-number of the deleted node. If the block being freed is not adjacent to the range of blocks in the located node, a new node is inserted into the tree 604 with a range that contains only the block number of the block being freed.

The blocks contained in the pinfile structure 602, or more specifically, in the corresponding B+ tree may be referred to herein as pinned blocks. A pinned block is an indirect block or data block in a snapshotted file that represents a region of the file that was written to while a file backup was being performed. Because a written region requires copy-on-write operations to be performed, the file writer had to write the data to new blocks (as described earlier). As a result, the primary file no longer points to the snapshot blocks that correspond to the new blocks that were written to, and as such, these snapshot blocks need to be marked available. However, if the free space manager simply handed these snapshot blocks to new files for reservation/allocation, there is a possibility that the backup-read application might see garbage data.

Referring again to FIG. 11, at block 1108, the free space manager may receive a first request to reserve blocks from a first requestor (e.g., a cluster member). At block 1110, the free space manager may allocate one or more blocks to the first requestor. However, the free space manager will ensure that no block that belongs to a pinfile data structure (or more specifically no block contained in a corresponding B+ tree) is made available to the first requestor or to any subsequent requestor until the backup application has completed its backup-read processing of the file.

When the backup application has completed backup-read processing for a file, and that file was updated while the backup application was processing, the backup application calls the free space manager to free any pinned blocks for that file. The free space manager may receive, at block 1112, the call indicating that the read processing is complete. At block 1114, the free space manager frees the pinned blocks in the tree structure corresponding to the file, thereby making them available for allocation to future requestors. At block 1116, the free space manager may receive a second request to reserve blocks from a second requestor (e.g., a cluster member). Now that the free space manager has unpinned the blocks in the pinfile structure corresponding to the file that was previously written to and for which backup-read processing has completed, those unpinned blocks became available for allocation. Accordingly, at block 1118, the free space manager allocates one or more blocks to the second requestor. The allocated blocks(s) may now include any of the unpinned blocks.

In certain example embodiments, if the system on which the backup application is running goes down, the cluster owner may make available all pinned blocks in all pinfile data structures. If the cluster owner itself goes down, then any backup applications running on other cluster systems may be presented with an IO error and instructed to re-run the backup once a new cluster owner is designated.

Example embodiments of the disclosure provide various technical features, technical effects, and/or improvements to technology. For instance, example embodiments of the disclosure provide the technical effect of allowing a system to perform a read of a file without disrupting other systems from reading or writing to the file, while providing a significantly reduced implementation cost and improved performance over conventional methods for allowing concurrent reading and writing of a file. This technical effect is achieved at least in part by the technical feature of generating a memory-only snapshot of a file (or more specifically an in-memory copy of the allocation information of the file) for use by a system performing a read of the file without disrupting other systems from reading or writing to the file. This technical effect is also achieved, at least in part, by providing a lock manager that is configured to determine that a backup read is in-progress based on the receipt of allocation information of a file in connection with a reply to a lock revoke and that is further configured to send the allocation information to a writer in connection with a write lock to inform the writer that is must perform copy-on write operations. This technical effect is further achieved, at least in part, by providing a free space manager that is configured to pin blocks that are to be freed based on a write to a file until backup read processing of the file is completed. The above-mentioned technical effect and technical features individually and together constitute an improvement to the functioning of a computer, in particular, an improvement to the concurrent reading and writing to files. It should be appreciated that the above examples of technical features, technical effects, and improvements to the functioning of a computer and computer technology provided by example embodiments of the disclosure are merely illustrative and not exhaustive.

Some conventional solutions require applications wishing to write to a file to wait until the backup read processing has completed. However, if the file is large, this would result in unacceptable delays and would appear as a hang to the system. Another conventional solution employs a permanent on-disk snapshot of the file (sometimes referred to as a clone). Such a solution requires that a backup read essentially become a write operation where a new inode would have to be created for the clone and an on-disk copy of the primary file inode would have to be made. Example embodiments of the disclosure provide an improvement to computer technology by avoiding the overhead associated with generating an on-disk clone while still allowing concurrent reads and writes to a file, and thus, avoiding the delay associated with requiring a writer to wait until backup read processing is complete.

In addition, example embodiments of the disclosure provide an improvement to computer technology by eliminating the need for a number of other tasks associated with creating permanent on-disk clones, and thus, eliminating the overhead associated therewith. For example, creating a permanent on-disk clone would require an automatic clean-up system if the system performing the read of the file crashed in order to clean up the existing cloned inodes. Additionally, a file system integrity checking system/repair system would have to be updated to handle the primary file/clone pair.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 12:
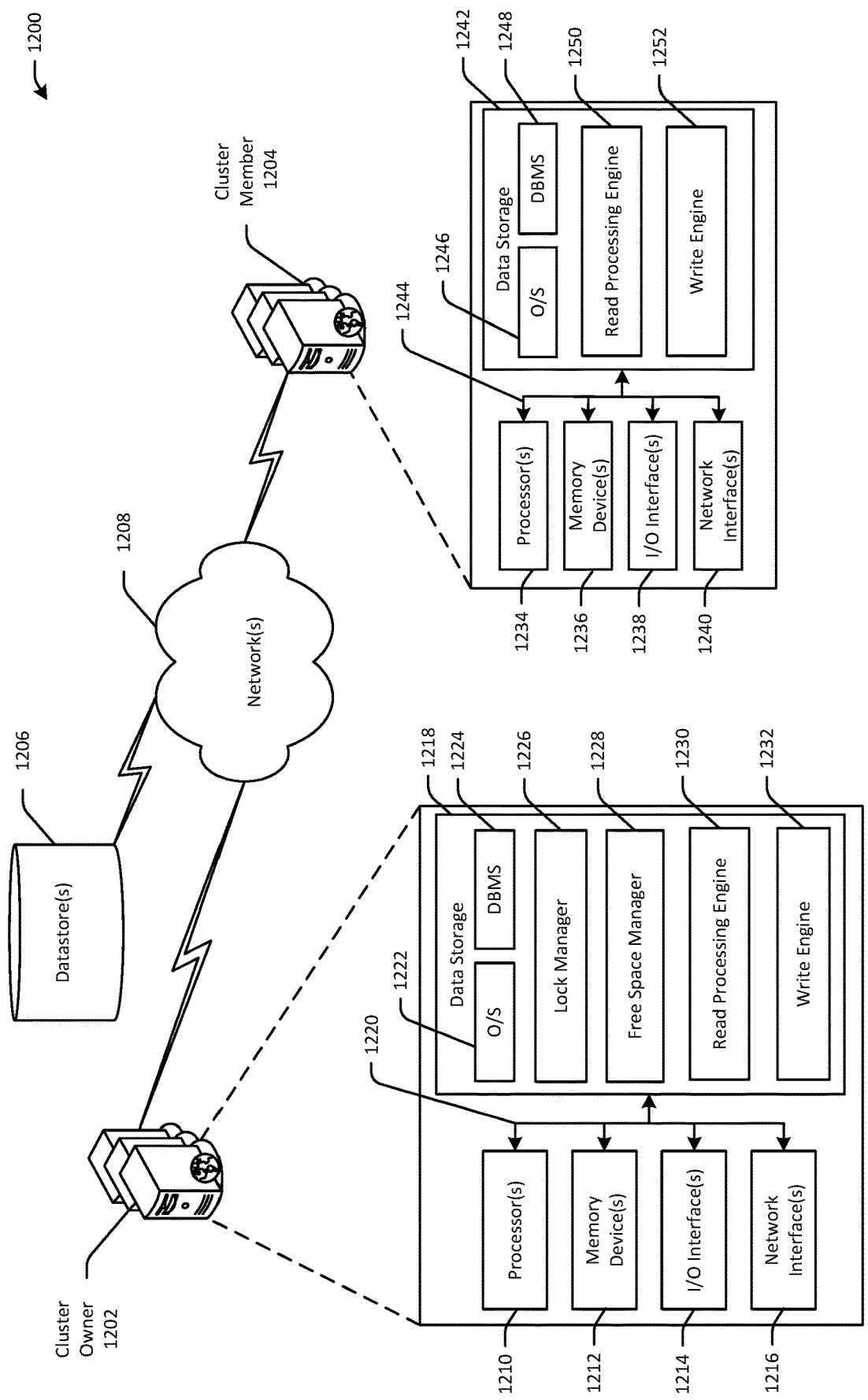
FIG. 12 is a schematic diagram of an illustrative networked architecture configured to implement one or more example embodiments of the disclosure.

FIG. 12 is a schematic diagram of an illustrative networked architecture 1200 configured to implement one or more example embodiments of the disclosure. The networked architecture 1200 may be implemented as a clustered file system in one or more example embodiments of the disclosure. When implemented as a clustered file system, the networked architecture 1200 may include two or more cluster member systems. At least one cluster member may serve as an owner of the clustered file system and may be responsible for lock management and/or free space management. For example, in the illustrative implementation depicted in FIG. 12, the networked architecture 1200 includes a cluster owner system 1202 and one or more additional cluster members 1204. The cluster members may be configured to communicate via one or more networks 1208. In addition, the cluster members may access one or more datastores 1206 (e.g., a shared file system) over the network(s) 1208. While any particular component of the networked architecture 1200 may be described herein in the singular (e.g., a cluster member 1204), it should be appreciated that multiple instances of any such component may be provided, and functionality described in connection with a particular component may be distributed across multiple ones of such a component.

The network(s) 1208 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 1208 may have any suitable communication range associated therewith and may include, for example, global networks (e.g., the Internet), metropolitan area networks (MANs), wide area networks (WANs), local area networks (LANs), or personal area networks (PANs). In addition, the network(s) 1208 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. In addition, the network(s) 1208 may include any of the types of networks described in connection with the network(s) 114 depicted in FIG. 1.

In an illustrative configuration, the cluster owner 1202 may include one or more processors (processor(s)) 1210, one or more memory devices 1212 (generically referred to herein as memory 1212), one or more input/output ("I/O") interface(s) 1214, one or more network interfaces 1216, and data storage 1218. The cluster owner 1202 may further include one or more buses 1220 that functionally couple various components of the cluster owner 1202.

The bus(es) 1220 may include at least one of a system bus, a memory bus, an address bus, or a message bus, and may permit the exchange of information (e.g., data (including computer-executable code), signaling, etc.) between various components of the cluster owner 1202. The bus(es) 1220 may include, without limitation, a memory bus or a memory controller, a peripheral bus, an accelerated graphics port, and so forth. The bus(es) 1220 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1212 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1212 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1212 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1218 may include removable storage and/or non-removable storage including, but not limited to, magnetic storage, optical disk storage, and/or tape storage. The data storage 1218 may provide non-volatile storage of computer-executable instructions and other data. The memory 1212 and the data storage 1218, removable and/or non-removable, are examples of computer-readable storage media (CRSM) as that term is used herein.

The data storage 1218 may store computer-executable code, instructions, or the like that may be loadable into the memory 1212 and executable by the processor(s) 1210 to cause the processor(s) 1210 to perform or initiate various operations. The data storage 1218 may additionally store data that may be copied to memory 1212 for use by the processor(s) 1210 during the execution of the computer-executable instructions. Moreover, output data generated as a result of execution of the computer-executable instructions by the processor(s) 1210 may be stored initially in memory 1212 and may ultimately be copied to data storage 1218 for non-volatile storage.

More specifically, the data storage 1218 may store one or more operating systems (O/S) 1222; one or more database management systems (DBMS) 1224 configured to access the memory 1212 and/or one or more external datastores 1206 including, for example, a shared file system; and one or more program modules, applications, engines, managers, computer-executable code, scripts, or the like such as, for example, a lock manager 1226, a free space manager 1228, a read processing engine 1230, and a write engine 1232. Any of the components depicted as being stored in data storage 1218 may include any combination of software, firmware, and/or hardware. The software and/or firmware may include computer-executable instructions (e.g., computer-executable program code) that may be loaded into the memory 1212 for execution by one or more of the processor(s) 1210 to perform any of the operations described earlier in connection with correspondingly named modules, engines, managers, or the like. The read processing engine 1230 and the write engine 1232 may be configured to perform any aspect of the backup-read processing and any aspect of the write operations described herein (e.g., copy-on write operations), respectively.

Although not depicted in FIG. 12, the data storage 1218 may further store various types of data utilized by components of the cluster owner 1202 and/or by other cluster members 1204 (e.g., lock management structures, in-memory file snapshot structures, free space management structures, etc.). Any data stored in the data storage 1218 may be loaded into the memory 1212 for use by the processor(s) 1210 in executing computer-executable instructions. In addition, any data stored in the data storage 1218 may potentially be stored in the external datastore(s) 1206 and may be accessed via the DBMS 1224 and loaded in the memory 1212 for use by the processor(s) 1210 in executing computer-executable instructions.

The processor(s) 1210 may be configured to access the memory 1212 and execute computer-executable instructions loaded therein. For example, the processor(s) 1210 may be configured to execute computer-executable instructions of the various program modules, applications, engines, managers, or the like of the cluster owner 1202 to cause or facilitate various operations to be performed in accordance with one or more embodiments of the disclosure. The processor(s) 1210 may include any suitable processing unit capable of accepting data as input, processing the input data in accordance with stored computer-executable instructions, and generating output data. The processor(s) 1210 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1210 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1210 may be capable of supporting any of a variety of instruction sets.

Referring now to other illustrative components depicted as being stored in the data storage 1218, the O/S 1222 may be loaded from the data storage 1218 into the memory 1212 and may provide an interface between other application software executing on the cluster owner 1202 and hardware resources of the cluster owner 1202. More specifically, the O/S 1222 may include a set of computer-executable instructions for managing hardware resources of the cluster owner 1202 and for providing common services to other application programs. In certain example embodiments, the O/S 1222 may include or otherwise control execution of one or more of the program modules, engines, managers, or the like depicted as being stored in the data storage 1218. The O/S 1222 may include any operating system now known or which may be developed in the future including, but not limited to, any server operating system, any mainframe operating system, or any other proprietary or non-proprietary operating system.

The DBMS 1224 may be loaded into the memory 1212 and may support functionality for accessing, retrieving, storing, and/or manipulating data stored in the memory 1212, data stored in the data storage 1218, and/or data stored in external datastore(s) 1206. The DBMS 1224 may use any of a variety of database models (e.g., relational model, object model, etc.) and may support any of a variety of query languages. The DBMS 1224 may access data represented in one or more data schemas and stored in any suitable data repository. External datastore(s) 1206 that may be accessible by the cluster owner 1202 via the DBMS 1224 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the cluster owner 1202, the input/output (I/O) interface(s) 1214 may facilitate the receipt of input information by the cluster owner 1202 from one or more I/O devices as well as the output of information from the cluster owner 1202 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the cluster owner 1202 or may be separate. The I/O devices may further include, for example, any number of peripheral devices such as data storage devices, printing devices, and so forth.

The I/O interface(s) 1214 may also include an interface for an external peripheral device connection such as universal serial bus (USB), FireWire, Thunderbolt, Ethernet port or other connection protocol that may connect to one or more networks. The I/O interface(s) 1214 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The cluster owner 1202 may further include one or more network interfaces 1216 via which the cluster owner 1202 may communicate with any of a variety of other systems, platforms, networks, devices, and so forth. The network interface(s) 1216 may enable communication, for example, with one or more other devices via one or more of the network(s) 1208.

Referring now to a non-owner cluster member 1204, in an illustrative configuration, a cluster member 1204 may include one or more processors (processor(s)) 1234, one or more memory devices 1236 (generically referred to herein as memory 1236), one or more input/output ("I/O") interface(s) 1238, one or more network interfaces 1240, and data storage 1242. The cluster member 1204 may further include one or more buses 1244 that functionally couple various components of the cluster member 1202. The data storage 1242 may store one or more operating systems (O/S) 1246; one or more database management systems (DBMS) 1248 configured to access the memory 1236 and/or the datastore(s) 1206; and one or more program modules, applications, engines, managers, computer-executable code, scripts, or the like such as, a read processing engine 1250 and a write engine 1252. The read processing engine 1250 and the write engine 1252 may provide functionality equivalent to the functionality provided by the read processing engine 1230 and the write engine 1232. In certain example embodiments, the lock manager and free space manager may not reside on a cluster member 1204 if the cluster member 1204 is not tasked with ownership responsibilities for the clustered file system.

The processor(s) 1234 may include any of the types of processors and any of the associated functionality described in reference to the processor(s) 1210 of the cluster owner 1202. The memory 1236 may include any of the types of memory and any of the associated functionality described in reference to the memory 1212 of the cluster owner 1202. The I/O interface(s) 1238 may include any of the types of I/O interface(s) and any of the associated functionality described in reference to the I/O interface(s) 1214 of the cluster owner 1202. The network interface(s) 1240 may include any of the types of network interface(s) and any of the associated functionality described in reference to the network interface(s) 1216 of the cluster owner 1202. The O/S 1246 may include any of the types of operating systems and any of the associated functionality described in reference to the O/S 1222 of the cluster owner 1202. And, the DBMS 1248 may include any of the types of database management systems and any of the associated functionality described in reference to the DBMS 1224 of the cluster owner 1202.

It should be appreciated that the program modules depicted in FIG. 12 as being stored in the data storage 1218 and/or the data storage 1242 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the cluster owner 1202, a cluster member 1204, and/or other computing devices accessible via the network(s) 1208, may be provided to support functionality provided by the modules depicted in FIG. 12 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 12 may be implemented, at least partially, in hardware and/or firmware across any number of devices.

It should further be appreciated that the cluster owner 1202 and/or the cluster member 1204 may include alternate and/or additional hardware, software, or firmware components beyond those described or depicted without departing from the scope of the disclosure. More particularly, it should be appreciated that software, firmware, or hardware components depicted as forming part of the cluster owner 1202 and/or the cluster member 1204 are merely illustrative and that some components may not be present or additional components may be provided in various embodiments. While various illustrative modules have been depicted and described as software modules stored in data storage 1224 and/or the data storage 1242, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the methods 1000 or 1100 may be performed by a cluster owner 1202 having the illustrative configuration depicted in FIG. 12, or more specifically, by one or more program modules, engines, applications, or the like executable on such a device. Similarly, one or more operations of the methods 800 or 900 may be performed by a cluster member 1204 having the illustrative configuration depicted in FIG. 12, or more specifically, by one or more program modules, engines, applications, or the like executable on such a device. It should be appreciated that the cluster owner 1202 may also perform any operations that cluster member 1204 is generally able to perform such as backup-read processing and copy-on write operations. It should be appreciated, however, that such operations may be implemented in connection with numerous other device configurations.

The operations described and depicted in the illustrative methods of FIGS. 8-11 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 8-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for concurrent writing to a file during backup of the file, the method comprising:

receiving, from a first system, a first file system call to read the file, wherein the file is stored on a shared file system;

sending, by a lock manager, a lock to read the file to the first system;

receiving, from a second system, a second file system call to write to the file;

sending, by the lock manager, a lock revoke to the first system to revoke the lock to read the file;

receiving, from the first system, a lock revoke reply comprising allocation information of the file;

sending, by the lock manager, a lock to write to the file to the second system;

sending, by the lock manager, the allocation information of the file to the second system to instruct the second system to perform copy-on write operations;

caching, by the lock manager, the allocation information of the file in lock manager memory by generating a snapshot data structure comprising the allocation information, wherein the snapshot data structure further indicates that the first system is reading the file and the second system is writing to the file;

receiving, from the first system, a message indicating that a backup read of the file is complete;

deleting the snapshot data structure; and sending, by the lock manager, a close message to the second system, wherein the second system ceases the copy-on write operations based at least in part on receipt of the close message.

2. The computer-implemented method of claim 1, wherein sending the allocation information of the file comprises sending the allocation information of the file in association with the lock to write to the file.

3. The computer-implemented method of claim 1, further comprising:
receiving, from the second system, a file system call indicating that the write to the file is complete;
identifying, by a free space manager, a set of blocks of the file to be freed based at least in part on the write to the file; and
generating, by the free space manager, a pinfile data structure indicating that the set of blocks to be freed is pinned.

4. The computer-implemented method of claim 3, further comprising generating, by the free space manager, a B+ tree containing the set of blocks to be freed, wherein the pinfile data structure points to the B+ tree.

5. The computer-implemented method of claim 3, wherein the set blocks to be freed is a first set of blocks, the method further comprising:
receiving, from a third system, a request to reserve blocks of the shared file system; and
allocating, by the free space manager, a second set of blocks to the third system, the second set of blocks excluding the first set of blocks.

6. The computer-implemented method of claim 5, further comprising:
receiving, from the first system, a message indicating that a backup read of the file is complete; and
unpinning, by the free space manager, the first set of blocks from the pinfile data structure to make the first set of blocks available for allocation.

7. The computer-implemented method of claim 6, further comprising:
receiving, from a fourth system, a request to reserve blocks of the shared file system; and
allocating, by the free space manager, a third set of blocks to the third system, the third set of blocks comprising at least block of the first set of blocks.

8. A computer program product for concurrent writing to a file during backup of the file, the computer program product comprising a storage medium readable by a processing circuit, the storage medium storing instructions executable by the processing circuit to cause a method to be performed, the method comprising:
making a file system call to an owner system to request a lock to write to the file, wherein the file is stored on a shared file system;
receiving, from the owner system, the lock to write to the file;
receiving, from the owner system, allocation information of the file in association with the lock to write to the file;
determining that copy-on write operations are required based at least in part on receipt of the allocation information of the file;
generating an in-memory snapshot data structure comprising the allocation information; and
performing the copy-on write operations, wherein performing the copy-on write operations comprises a reservation phase, a disk-writing phase, and an IO complete phase, and
wherein the reservation phase comprises:
allocating memory buffers for portions of the file that are being written to;
utilizing the snapshot data structure to cache a snapshot indirect block branch;
performing a parallel traversal of the snapshot indirect block branch and an indirect block branch of the file that reflects the portions of the file that are being written to in order to identify at least one of one or more indirect blocks or one or more data blocks of the file to be reserved; and
reserving the at least one of the one or more indirect blocks or the one or more data blocks.

9. The computer program product of claim 8, wherein performing the parallel traversal comprises determining that a first physical address of an indirect block in the snapshot indirect block branch matches a second physical address of the indirect block in the indirect block branch of the file or determining that a first data block address in the snapshot indirect block branch matches a second data block address of a data block in the indirect block branch of the file.

10. The computer program product of claim 8, wherein the disk-writing phase comprises:
allocating one or more new blocks for the at least one of the one or more indirect blocks or the one or more data blocks; and
writing data to the one or more new blocks.

11. The computer program product of claim 8, wherein the IO complete phase comprises:
updating an inode of the file to point to the one or more new blocks; and
sending a notification to a free space manager to mark as in-use the one or more new blocks and mark as available the at least one of the one or more indirect blocks or the one or more data blocks,
wherein the free space manager pins the at least one of the one or more indirect blocks or the one or more data blocks to prevent allocation prior to completion of a backup read of the file.

* * * * *